(12) United States Patent
Cheng et al.

(10) Patent No.: US 12,334,836 B2
(45) Date of Patent: Jun. 17, 2025

(54) MAGNETICALLY COUPLED CHARGING SYSTEM AND THE METHOD THEREOF

(71) Applicant: THE HONG KONG POLYTECHNIC UNIVERSITY, Hong Kong (CN)

(72) Inventors: Ka Wai Eric Cheng, Hong Kong (CN); Shu Chuen Ip, Hong Kong (CN); Hon Ki Tsang, Hong Kong (CN); Kin Lung Jerry Kan, Hong Kong (CN); Wing Wa Chan, Hong Kong (CN); Ho Fai Ho, Hong Kong (CN); Yat Chi Fong, Hong Kong (CN)

(73) Assignee: THE HONG KONG POLYTECHNIC UNIVERSITY, Hong Kong (CN)

( * ) Notice: Subject to any disclaimer, the term of this patent is extended or adjusted under 35 U.S.C. 154(b) by 524 days.

(21) Appl. No.: 17/658,273

(22) Filed: Apr. 7, 2022

(65) Prior Publication Data

US 2022/0329173 A1 Oct. 13, 2022

(30) Foreign Application Priority Data

Apr. 8, 2021 (CN) .......................... 202110378318.3

(51) Int. Cl.
*H02M 5/458* (2006.01)
*B60L 53/16* (2019.01)
(Continued)

(52) U.S. Cl.
CPC ........... *H02M 5/458* (2013.01); *H02J 7/0042* (2013.01); *H02M 7/217* (2013.01); *B60L 53/16* (2019.02); *H02J 2207/20* (2020.01)

(58) Field of Classification Search
CPC ........ H02M 5/458; H02J 7/0042; B60L 53/16
(Continued)

(56) References Cited

U.S. PATENT DOCUMENTS 6,127,800 A * 10/2000 Kuki ..................... B60L 53/126
320/108
10,608,479 B2 * 3/2020 Baer ................... H02J 7/00034
(Continued)

FOREIGN PATENT DOCUMENTS

| CN | 105304960 A | 2/2016 |
| WO | 2012001291 A2 | 1/2012 |
| WO | 2017165549 A1 | 9/2017 |

OTHER PUBLICATIONS

Office Action of CN 202110378318.3 issued from the China National Intellectual Property Administration (CNIPA) on Apr. 7, 2025.

*Primary Examiner* — Jack Chiang
*Assistant Examiner* — Suchin Parihar
(74) *Attorney, Agent, or Firm* — S&F/WEHRW

(57) ABSTRACT

The invention relates to a magnetically coupled charging system and method. The magnetically coupled charging system comprises: a resonant inverter; a split core transformer configured to receive a resonant power from the resonant inverter; and a rectifier assembly configured to receive a transformed resonant power from the split core transformer and transmit the transformed resonant power to a to-be-charged battery; the split core transformer comprising a primary winding and a secondary winding, wherein the primary and secondary windings are split from each other, the resonant inverter and the primary winding of the split core transformer are arranged in an onshore charging system, the rectifier assembly and the secondary winding of the split core transformer are arranged in an onboard charger. The invention has the following advantages of: eliminating the risk of electric shock and short circuit fault at a connection point and eliminating an arcing or sparking problem.

9 Claims, 11 Drawing Sheets

(51) Int. Cl.
*H02J 7/00* (2006.01)
*H02M 7/217* (2006.01)

(58) Field of Classification Search
USPC .......................................................... 320/107
See application file for complete search history.

(56) References Cited

U.S. PATENT DOCUMENTS

| | | | |
|---|---|---|---|
| 11,264,825 B1* | 3/2022 | Harris | B60L 53/305 |
| 2011/0309687 A1* | 12/2011 | Bohori | H02J 50/12 |
| | | | 307/104 |
| 2012/0025758 A1* | 2/2012 | Bohori | B60L 53/122 |
| | | | 320/108 |
| 2012/0025942 A1* | 2/2012 | Bhat | H01F 38/14 |
| | | | 307/104 |
| 2012/0032632 A1* | 2/2012 | Soar | H02J 7/00034 |
| | | | 320/108 |
| 2015/0084426 A1* | 3/2015 | Wechlin | H02J 50/70 |
| | | | 307/104 |
| 2020/0023743 A1* | 1/2020 | Chang | B60L 53/12 |
| 2022/0379760 A1* | 12/2022 | Pathipati | B60L 53/30 |
| 2024/0083268 A1* | 3/2024 | Lee | H02J 50/005 |

* cited by examiner

MAGNETICALLY COUPLED CHARGING SYSTEM AND THE METHOD THEREOF

CROSS-REFERENCE TO RELATED APPLICATIONS

This application claims the benefit of China Patent Application No. 202110378318.3, filed on Apr. 8, 2021, which is incorporated by reference herein in its entirety.

FIELD OF THE INVENTION

The present invention relates to the field of charging technologies, and in particular to a magnetically coupled charging system and the method thereof.

BACKGROUND OF THE INVENTION

Among the means of transportation by sea, electric boats are means of using clean energy that can make the environment free from pollution. Not only can electric boats achieve zero carbon dioxide ($CO^2$) emissions, they also do not carry diesel fuel as a source of power as compared with the existing boats, so there is no risk of diesel leakage. In addition, electric boats are more energy efficient and can be seamlessly integrated with a renewable electric energy source. In general, a power supply for electric boats relies on a battery-based energy storage system that is charged by an electric supply onshore. However, this charging method is less than satisfactory. Since the electric boats are in the water, they are in an environment of extreme humidity and salinity, as well as an exposure to the seawater. Under such extreme conditions, the electrical conductors at the point of connection between the onshore electric supply and a receiving device of the electric supply of the electric boat are susceptible to corrosion and to electric shock, and short-circuit fault.

Currently, disclosed in the U.S. Pat. No. 6,127,800A is a magnetic coupling device for charging an electric car which includes split cores provided at one of a power receiving portion and a charging coupler. Disclosed in the Patent Publication No. WO2012001291A2 is related to a contactless charging of a motor vehicle battery and a mobile magnetic-core wireless charger suitable for electric vehicles. Disclosed in the Patent Publication No. WO2017165549A1 is wireless charging for electric vehicles. However, no safe charging method in a high-humidity environment has been provided.

Accordingly, there is a need in the art to develop a novel safe charging device and method suitable for electric boats. Furthermore, other desirable features and characteristics will become apparent from the subsequent detailed description and the appended claims, taken in conjunction with the accompanying drawings and this background of the disclosure.

SUMMARY OF THE INVENTION

Provided herein is a magnetically coupled charging system. It is an objective of the present disclosure to provide a safer and more durable power transmission solution that can be used for charging batteries of any suitable marine applications including electric boats.

In accordance with certain embodiments of the present disclosure, a magnetically coupled charging system is provided. The magnetically coupled charging system includes a resonant inverter; a split core transformer configured to receive a resonant power from the resonant inverter; and a rectifier assembly configured to receive a transformed resonant power from the split core transformer and transmit the transformed resonant power to a to-be-charged battery. The split core transformer includes a primary winding and a secondary winding. The primary winding and the secondary winding are split from each other. The resonant inverter and the primary winding of the split core transformer are arranged in an onshore charging system. The rectifier assembly and the secondary winding of the split core transformer are arranged in an onboard charger.

In accordance with a further aspect of the present disclosure, the primary winding and secondary winding of the split core transformer are wounded on two half cores respectively and sealed by surrounding filling.

In accordance with a further aspect of the present disclosure, the resonant inverter is configured as a full-bridge LLC resonant inverter, and direct current received by the full-bridge LLC resonant inverter is converted into high-frequency alternating current (HFAC) for supplying to the primary winding.

In accordance with a further aspect of the present disclosure, the onshore charging system further includes a first sealing portion for sealing the resonant inverter and the primary winding of the split core transformer.

In accordance with a further aspect of the present disclosure, the onboard charger further includes a second sealing portion for sealing the rectifier assembly and the secondary winding of the split core transformer.

In accordance with a further aspect of the present disclosure, the onshore charging system further includes a first locking portion. The first locking portion is located outside the first sealing portion and surrounding the first sealing portion as required or being located above the first sealing portion. The first locking portion includes a locking protrusion provided at its lower side. The onboard charger further includes a second locking portion. The second locking portion is configured as an upwardly protruding annular portion matched with the lower side of the first locking portion. A side surface of the annular portion includes a slot, wherein the slot corresponds to the locking protrusion of the first locking portion to receive and fix the locking protrusion in place during coupling.

In accordance with a further aspect of the present disclosure, the onshore charging system further includes a first digital controller connected to the split core transformer and the resonant inverter and configured to control a phase angle and frequency of the resonant inverter according to a predetermined charging mode.

In accordance with a further aspect of the present disclosure, the onshore charging system further includes a rectifier connected to a power supply for supplying power to the resonant inverter. The rectifier is configured to convert alternating current input from the power supply to direct current for supplying to the resonant inverter.

In accordance with a further aspect of the present disclosure, the onshore charging system further includes a capacitor connected in series with the split core transformer to compensate for a leakage inductance of the split core transformer and/or an excessive parasitic inductance caused by coupling between the onshore charging system and an external power supply.

In accordance with a further aspect of the present disclosure, the split core transformer is provided therein with a drain hole, and the drain hole communicates the first sealing portion of the onshore charging system with an outside location.

In accordance with a further aspect of the present disclosure, the onboard charger further includes a synchronous buck converter connected to the to-be-charged battery and the split core transformer, the synchronous buck converter is configured to determine a charging condition of the to-be-charged battery according to a battery voltage, a sensed average charging current and a state of the to-be-charged battery.

In accordance with a further aspect of the present disclosure, the onboard charger further includes a second digital controller connected to the split core transformer, the to-be-charged battery and the rectifier assembly, and the second digital controller optimizes the charging condition and safety of an energy storage system according to detected states of the onboard charger and the to-be-charged battery.

In accordance with a further aspect of the present disclosure, the second digital controller compensates the sensed average charging current according to a predefined reference current using a functional relationship in a case of constant current charging.

In accordance with a further aspect of the present disclosure, the onshore charging system is presented in the structure of a charging gun and includes a handle and a body. the handle and the body are connected, and the primary winding of the split core transformer is sealed in the body.

In accordance with a further aspect of the present disclosure, a wire hole is provided inside the handle and extends from one end of the handle to the other end, and a power supply wire is located in the wire hole or led out from the wire hole at the end of the handle.

In accordance with a further aspect of the present disclosure, the handle further includes a cable gland at the end of the handle and the cable gland is configured to close or open the wire hole as desired.

Compared with the traditional charging technology, the present invention has the following advantages of: eliminating the risk of electric shock and short circuit fault at a connection point; eliminating an arcing or sparking problem; providing galvanic isolation between the power supply and a receiver terminal; and eliminating concerns about the corrosion problem of exposed electrical conductors.

In a word, the present invention provides a safer and more durable power transmission solution that can be used for charging batteries of any suitable marine applications including electric boats, and can also be used for charging batteries in any environment, including harsh environments. In the meanwhile, the system is easy to operate and can obtain stable performance in a wide range of working conditions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other aspects and advantages of the present invention are disclosed as illustrated by the embodiments hereinafter.

BRIEF DESCRIPTION OF THE DRAWINGS

The appended drawings contain figures to further illustrate and clarify the above and other aspects, advantages, and features of the present disclosure. It will be appreciated that these drawings depict only certain embodiments of the present disclosure and are not intended to limit its scope. It will also be appreciated that these drawings are illustrated for simplicity and clarity and have not necessarily been depicted to scale. The present disclosure will now be described and explained with additional specificity and detail through the use of the accompanying drawings in which.

DETAILED DESCRIPTION OF THE INVENTION

Figure 1:
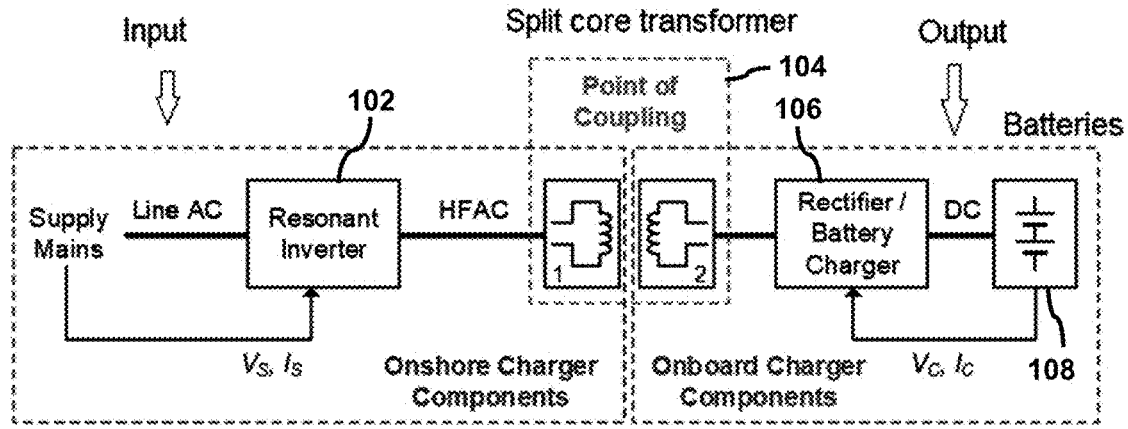
FIG. 1 is a functional block diagram of a magnetically coupled charging system according to an embodiment of the present disclosure.

The present disclosure generally relates to a charging device and method for charging a battery of an electric vehicle, for example, an electric boat. More specifically, but without limitation, the charging device includes a mating mechanism and design of a completely insulated connector based on a magnetically split core transformer, and electrical regulating circuits at drive and receiver terminals. The charging device and method of the present invention can also provide power for motor vehicles, industrial, and marine applications. Therefore, the device and the method can be applied to the marine transportation industry, the automobile industry, the railway transportation industry, and the electric power industry.

The following detailed description is merely exemplary in nature and is not intended to limit the disclosure or its application and/or uses. It should be appreciated that a vast number of variations exist. The detailed description will enable those of ordinary skilled in the art to implement an exemplary embodiment of the present disclosure without undue experimentation, and it is understood that various changes or modifications may be made in the function and structure described in the exemplary embodiment without departing from the scope of the present disclosure as set forth in the appended claims.

The benefits, advantages, solutions to problems, and any element(s) that may cause any benefit, advantage, or solution to occur or become more pronounced are not to be construed as a critical, required, or essential features or elements of any or all of the claims. The invention is defined solely by the appended claims including any amendments made during the pendency of this application and all equivalents of those claims as issued.

Terms such as "upper", "lower", "inner", "outer", "top", "bottom", and any variations thereof are used for ease of description to explain the positioning of an element, or the positioning of one element relative to another element, and are not intended to be limiting to a specific orientation or position. Terms such as "first", "second", and the like are used herein to describe various elements, components, regions, sections, etc., and are not intended to be limiting.

When introducing elements of the present disclosure or the preferred embodiments thereof, the articles "a", "an", and "the" are not intended to denote a limitation of quantity, but rather to denote the presence of at least one of the items being referred to, unless otherwise indicated or clearly contradicted by context. Further, the terms "comprise", "comprising", "include", "including", and "having" are intended to be inclusive and mean that there may be additional elements other than the listed elements.

The magnetically coupled charging system of the present invention includes: an onshore charging system, the onshore charging system including a resonant inverter or being only configured as a resonant inverter, the onshore charging system being configured to generate a resonant power for a split core transformer; a split core transformer configured to receive the resonant power from the resonant inverter, the split core transformer being waterproof so that conductors are all sealed in an IP66-level dustproof and waterproof enclosure without exposing any conductors, the split core transformer including a primary side and a secondary side, the primary side being connected to the onshore charging system, the secondary side being connected to a rectifier/battery charger to charge a battery; and the rectifier/battery charger configured to receive a transferred resonant power from the split core transformer and transmit the transferred resonant power to the to-be-charged battery. The split core transformer forms an interface between the resonant inverter and a receiver and the interface is configured as a pluggable connection interface without exposed conductors.

The present invention provides a system and method for charging a battery of an electric boat. The present invention achieves the mating mechanism and design of the completely insulated connector based on magnetically split cores and electrical regulating circuits at drive and receiver terminals.

FIG. 1 is a functional block diagram of the magnetically coupled charging system according to an embodiment of the present invention. As shown in FIG. 1, the magnetically coupled charging system according to an embodiment of the present disclosure includes two parts: an onshore charger components and an onboard charger components. An input of the onshore charger components is powered by a typical alternating current (AC) supply, but can also be powered by a direct current (DC) supply. A resonant inverter 102 (e.g., a full-bridge LLC resonant inverter) in the onshore charger converts DC to HFAC. The DC is obtained by converting supply mains AC of a mains frequency through a rectifier. Alternatively, the DC may directly come from the DC supply. The HFAC is supplied to a primary winding of a split core transformer 104 embedded in a charging gun after being transmitted and converted through a cable, for example, made of a Litz wire. A secondary winding of the split core transformer 104, for example on an electric boat or other suitable electric vehicles, receives the HFAC and transmits the HFAC to a rectifier assembly 106 as a battery charger. The HFAC is then converted to DC by the rectifier assembly 106 to charge a DC battery 108 (referred to as a "to-be-charged battery), thereby providing constant current (CC) and constant voltage (CV) charging modes according to the specifications of an energy storage system. In other words, the rectifier assembly 106 is configured to receive a transformed resonant power from the split core transformer 104 and transmit the transformed resonant power to a to-be-charged battery 108. At a point of coupling between the onshore charger and the onboard charger, the HFAC is transmitted by a magnetic field.

Therefore, by virtue of the magnetically coupled charging system according to the embodiment of the present disclosure, and in particular by the specific split core transformer with a water leakage arrangement in the magnetically coupled charging system, when the conductors in the charging gun and the receiver are completely insulated, the transfer of the magnetic power is achieved. This way of the magnetic field transmission eliminates the risk of electric shock and short circuit failure.

Figure 2:
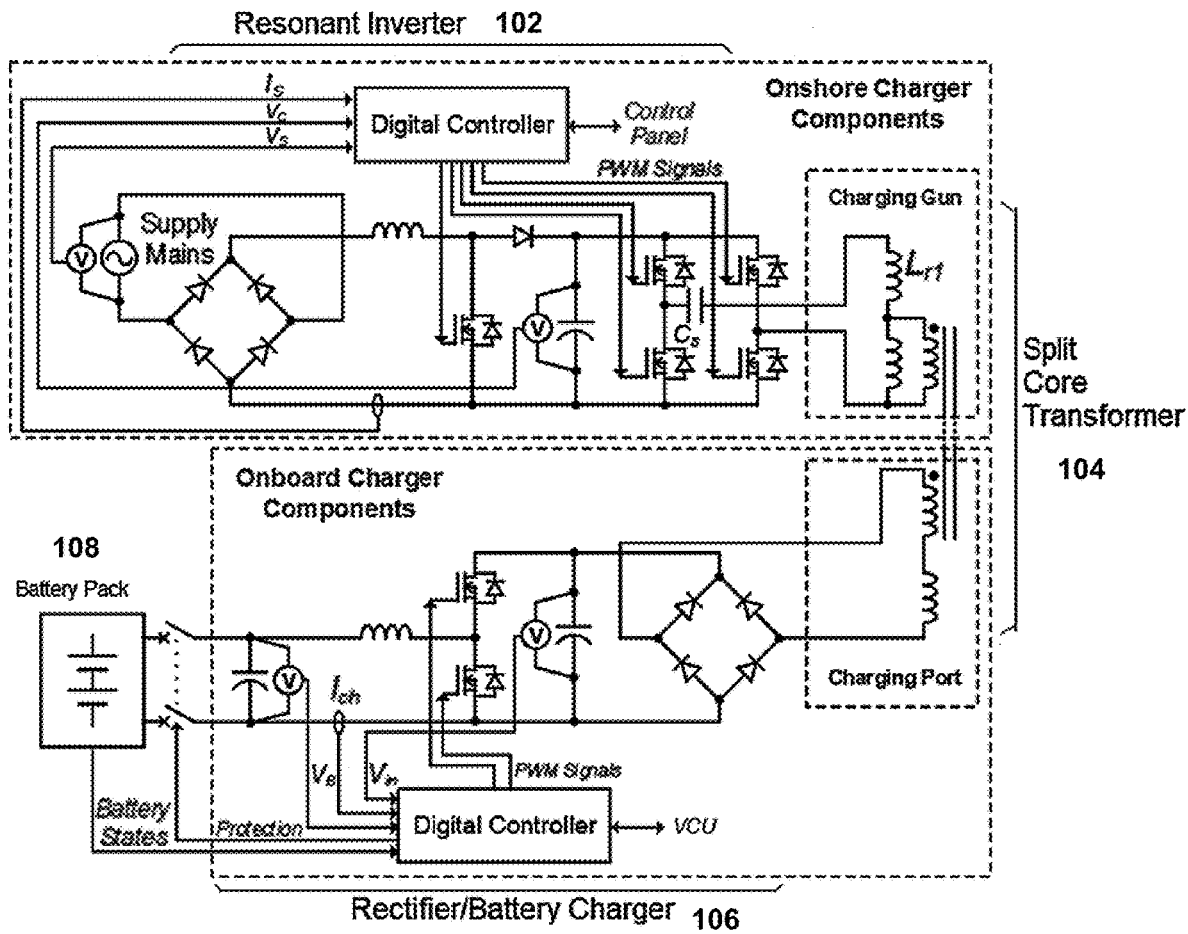
FIG. 2 is a schematic diagram of a circuit structure of the magnetically coupled charging system according to an embodiment of the present disclosure, showing a plurality of components and circuit distribution.

FIG. 2 is a schematic diagram of a circuit structure of the magnetically coupled charging system according to an embodiment of the present invention, showing a plurality of important components, control components, and circuit distribution. As shown in FIG. 2, the onshore charger system includes a rectifier, an inductive capacitor, an inverter, a first digital controller, and a portion of the split core transformer 104, which are sealed in a storage mechanism such as a charging box. The rectifier can be any suitable rectifier that converts AC to DC, such as a rectifier (also known as a boost converter) composed of metal-oxide-semiconductor field-effect transistors (MOSFETs) and diodes. The boost converter is configured for power factor correction (PFC) at an input side. Certainly, other suitable PFC circuits may also be used. As an inverter, an H-bridge consists of a resonant capacitor that works together with the inductance of the split core transformer 104 to form resonance.

A primary side of the split core transformer 104 (also known as a high-frequency transformer) in the onshore charging system, i.e. the primary winding at the charging gun, is driven by the HFAC generated by the resonant inverter 102 (such as the H-bridge, also known as a full-bridge LLC resonant inverter). The output of the resonant inverter 102 is transmitted through an HFAC lead, e.g., made of a Litz wire or an insulated/coated stranded wire. Leakage inductance of the split core transformer 104 and/or an excessive parasitic inductance caused by cable connection between a charging pile and the charging gun are both compensated by capacitors connected in series, such as high-voltage polyester film capacitors CS. The compensation of the capacitors improves the power quality of the AC provided by the power supply through the HFAC cable, and provides a zero-voltage switching condition for four switches of the full-bridge LLC resonant inverter 102. A DC connection portion of the full-bridge LLC resonant inverter 102 is powered by a boost converter, such as a boost PFC rectifier of a single-phase power supply mains. The boost PFC rectifier regulates the voltage received from the power supply mains to DC for supplying to the full-bridge LLC resonant inverter 102. The primary winding is excited by the HFAC generated by the full-bridge LLC resonant inverter 102 of the onshore charger system.

The onshore charging system is controlled by a first digital controller. The first digital controller controls the PFC rectifier and the full-bridge LLC resonant inverter 102 to optimize the energy efficiency and stability of the charging system. Mains AC voltage waveform $V_S$ is sensed and input to the first digital controller to generate a reference input current signal, the rectified current $I_S$ is fed back to the first digital controller, and the first digital controller regulates the duty cycle of the rectifier with MOSFETs so that the waveform of the input current is in phase with that of the mains current and the average voltage DC connection voltage $V_C$ is also regulated to a predetermined value. In the meanwhile, the power consumed by the magnetically coupled charging system is also estimated by the first digital controller according to the current and voltage input thereto and is used to determine a charging mode, as well as a state and operation information displayed on a control panel. The first digital controller determines the charging mode according to the situation, and there are two charging modes: constant current charging mode and constant voltage charging mode. The constant current charging mode is a charging mode performed before a predetermined constant voltage charging voltage is reached. During an initial charging process, the to-be-charged battery is first charged in the constant current charging mode; then, when the voltage of the battery reaches the predetermined constant voltage charging voltage, the first digital controller switches the charging mode to the constant voltage charging mode. Additionally, the onboard charger may further include a buck converter to control the charging mode of the onboard charger. The phase angle and frequency of the full-bridge LLC resonant inverter 102 are controlled by the first digital controller according to a pre-determined charging mode. When a phase difference between the charging voltage and current of the resonant inverter 102 is relatively large (this situation often occurs in a light-load charging interval), the first digital controller reduces the switching frequency of a switching power element with a predetermined charging strategy to optimize energy efficiency and compensate line frequency ripples at a DC connection capacitor under different charging conditions.

A magnetic field generated by the primary winding inside the charging gun connected to the charging pile is coupled to the secondary winding, also known as a receiving winding, at a charging port on the electric boat through a 4 mm air gap of a dielectric material. Optionally, a magnetically split core made of a high μr material can be inserted into the charging gun and the charging port respectively to increase mutual inductance and coupling coefficient. A primary winding in the magnetically split core is wound on a half core, such as a pot-shaped core or an E-shaped core. A secondary winding in the magnetically split core consists of a half core, such as a pot-shaped core or an E-shaped core of the same shape as the half core used for the primary winding. In the case of the pot-shaped core, there is a wired hole at the top or bottom of the pot-shaped core to ensure a uniform coupling coefficient and a free rotation angle. Space around the half core is filled with high-temperature resistant nylon or epoxy or other fillings for protection and to block water from entering the winding and the surroundings of the half core. A drain hole 423 is formed in the fill space to allow any water left in an interface space between the primary and secondary windings to drain to the outside of the split core.

The onboard charger includes the other part of the split core transformer 104, a full-wave rectifier, a synchronous buck converter, a capacitor, an inductor, and a second digital controller. The full-wave rectifier is also known as a bridge rectifier. The synchronous buck converter is also known as a half-bridge converter. The inductor is configured to control the voltage and current output of a battery pack. The HFAC at the other part of the split core transformer 104, for example, the part including the receiving winding, is rectified by the full-wave rectifier. The constant current (CC) and constant voltage (CV) charging conditions of the to-be-charged battery 108 (it can also be a to-be-charged battery pack) are achieved by the synchronous buck converter through battery voltage $V_B$, average charging current $I_{ch}$ feedback, and state information provided by a management system of the to-be-charged battery 108. The state of the onboard charger and the initial duty cycle of the synchronous buck converter are determined by the rectified input voltage $V_{in}$ of the onboard charger. The rectified input voltage $V_{in}$ is obtained by rectifying the current from the receiving winding through the full-wave rectifier. The charging state can be detected by estimating the charging power from the detected rectified input line current. During CC charging, the Ich sensed by the second digital controller is compared to a predefined reference current setting. An error is compensated by a PI function in the second digital controller, and the second digital controller controls the duty cycle of the MOSFET accordingly. When the sensed $V_B$ reaches a predetermined value, the second digital controller controls the duty cycle of a pulse-width modulation (PWM) signal so that the output voltage of the onboard charger remains at a CV setting. The second digital controller optimizes the charging condition and the safety of the energy storage system according to the detected states of the charger and the battery. The synchronous buck converter consists of two MOSFETs or switching devices, and optionally, the charging mode of the onboard charger can be controlled by the synchronous buck converter. Before the charger is activated or after the to-be-charged battery 108 is full of power, the to-be-charged battery 108 is isolated from the onboard charger by a double throw switch or any other suitable switching device controlled by the second digital controller. This double throw switch also connects the onboard charger with a vessel control unit (VCU) of the electric boat. Based on the detected rectified input voltage and battery voltage, as well as signals from the battery management system and the VCU, the states of the onshore charger system, the onboard charger, and the battery are detected.

Figure 3:
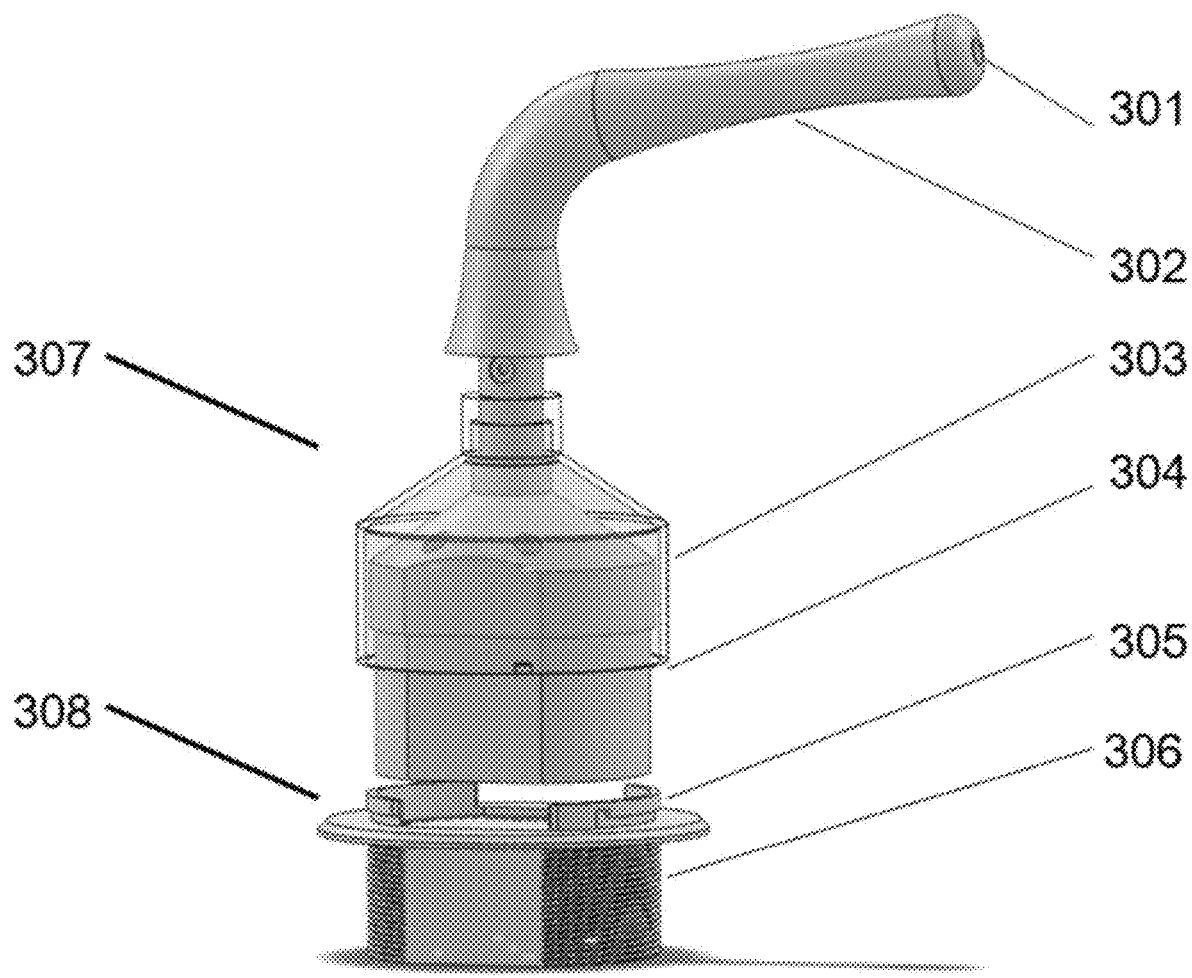
FIG. 3 illustrates the magnetically coupled charging system according to an embodiment of the present disclosure, showing a charging gun and a charging port.

FIG. 3 illustrates a mechanical structure of the magnetically coupled charging system according to an embodiment of the present invention, where the onshore charging system presented in the structure of a charging gun and the onboard charger presented in the structure of a charging port are shown. As shown in the figure, the charging gun 307 and the charging port 308 are connected. In this case, the primary and receiving windings and half cores of the split core transformer 104 are sealed in the charging gun 307 and the charging port 308, respectively. The charging gun 307 includes a handle 302 and a body, the handle 302 and the body are connected, and the body includes a first locking portion 303 and a first sealing portion 304. In certain embodiments, the body houses the primary winding of the split core transformer 104 and the resonant inverter 102. The charging port 308 houses the rectifier assembly 106 and the secondary winding of the split core transformer 104. A wire hole 301 is provided inside the handle 302 and extends from one end of the handle 302 to the other end. For example, a power supply wire of the HFAC Litz wire cable is sealed in the handle 302 of the charging gun 307, and the HFAC Litz wire cable insulated with an insulating material is under the protection of a duplex sheath having an outer surface layer of an insulating material for insulation and a metal part for grounding. The power supply wire can also be led out from the wire hole 301 at the end of the handle 302. The handle 302 may also include a cable gland at the end of the handle 302 and the cable gland is configured to close or open the wire hole 301 as desired, so that a power supply from the outside can be connected to the power supply wire inside the handle 302, so as to power the onshore charger system of the body of the charging gun 307. When the cable gland is closed, the handle 302 can be sealed to achieve a water-tight and air-tight effect. Optionally, the cable gland is removable. To connect an external power supply, the cable gland is opened, and the power supply wire inside the handle 302 is connected to an external power supply wire. The first locking portion 303 is located outside the first sealing portion 304. The rectifier, capacitor, inverter, and first digital controller of the land power system and the primary winding of the split core transformer 104 are arranged and sealed in the first sealing portion 304. The first sealing portion 304 is, for example, a dustproof and waterproof box, in which the resonant inverter 102 and the primary winding of the split core transformer 104 are sealed, and which also includes the rectifier such as a mains rectifier device, the capacitor (i.e., a power compensator) and the full-bridge LLC resonant inverter 102. The dust-proof and waterproof box include a dustproof and waterproof box of at least IP66 protection level, and the waterproof box is placed onshore. The waterproof box includes two incoming and outgoing line positions: a mains inlet portion and a charging gun lead portion. The first sealing portion 304 may be formed from any suitable insulating material, integrally or by sealing connection. The charging gun 307 may be configured to completely seal electrical conductors and conducting components therein and to insulate the electrical conductors and the conducting components from the surrounding environment. The first sealing portion 304 may be filled with high-temperature resistant nylon or epoxy or other fillings to help seal other elements therein.

The charging port 308 is coupled with the charging gun 307 and includes a second sealing portion 306 and a second locking portion 305. The second locking portion 305 is located outside the second sealing portion 306. The onboard charger, including the secondary winding of the split core transformer 104, the full-wave rectifier, the synchronous buck converter, the capacitor, and the second digital controller, is arranged and sealed in the second sealing portion. In addition, the split core transformer 104 further includes the secondary winding and a half core/magnetically split core surrounded by the secondary winding, and the secondary winding is connected to the battery 108 through a wire hole at the bottom. Details will be given below with reference to FIGS. 4A to 4F. It can be seen from FIG. 3 that the charging gun 307 and the charging port 308 are configured to ensure a high degree of freedom in a rotation angle between the charging gun 307 and the charging port 308, while maintaining a relatively stable coupling coefficient between the primary winding and the secondary winding. The charging port 308 may be configured to completely seal electrical conductors and conducting components therein and to insulate the electrical conductors and the conducting components from the surrounding environment.

Figure 4A:
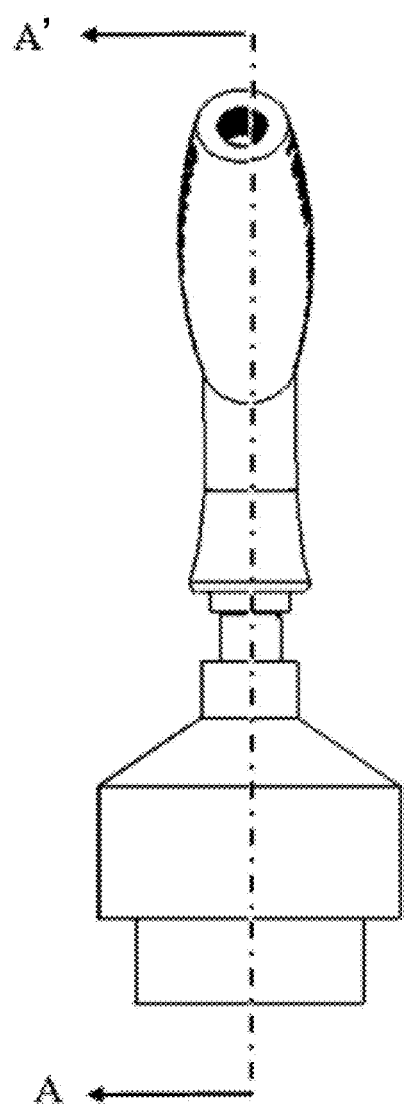
FIG. 4A illustrates a schematic diagram of the charging gun of the magnetically coupled charging system according to an embodiment of the present disclosure.
Figure 4B:
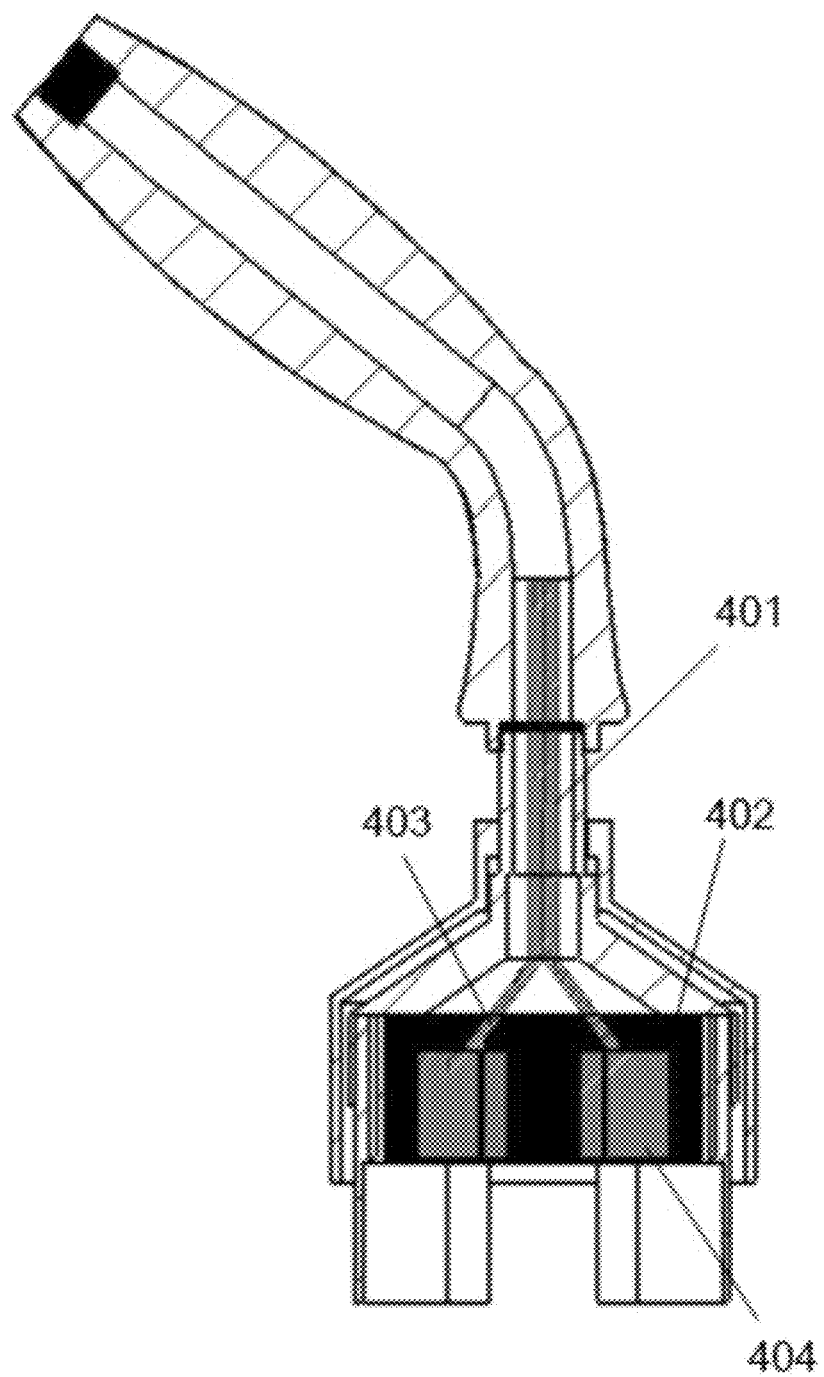
FIG. 4B schematically illustrates a cross-sectional view of the charging gun of the magnetically coupled charging system along the A-A' line of FIG. 4A according to an embodiment of the present disclosure.
Figure 4C:
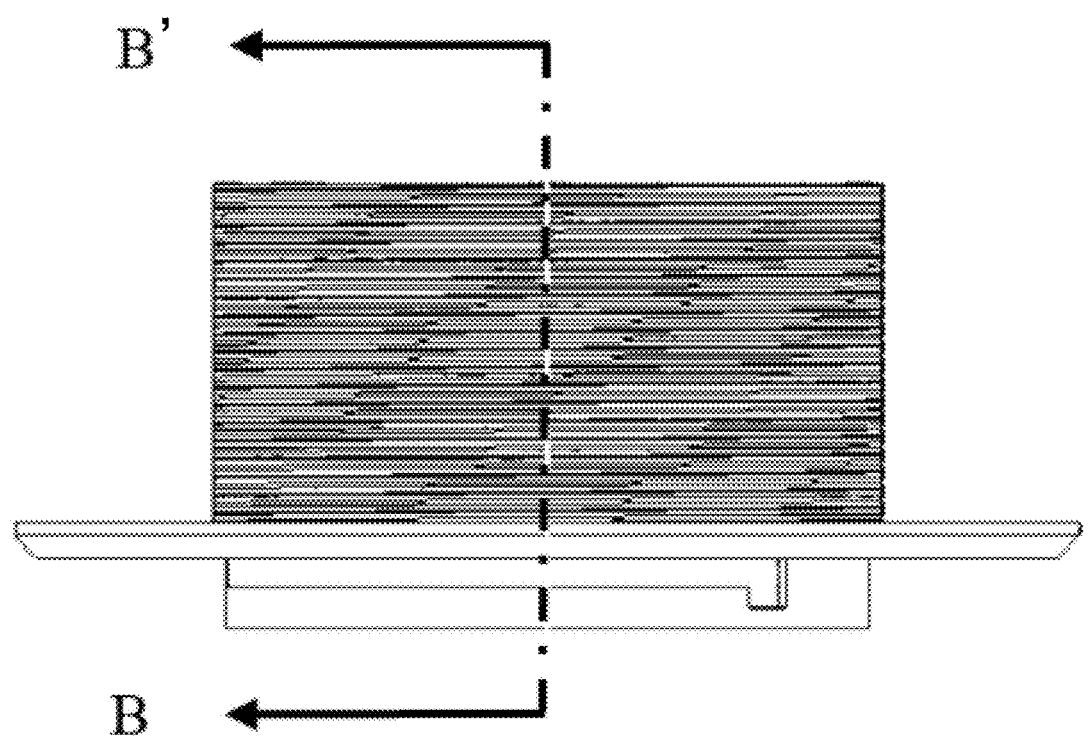
FIG. 4C illustrates a schematic diagram of the charging port of the magnetically coupled charging system according to an embodiment of the present disclosure.
Figure 4D:
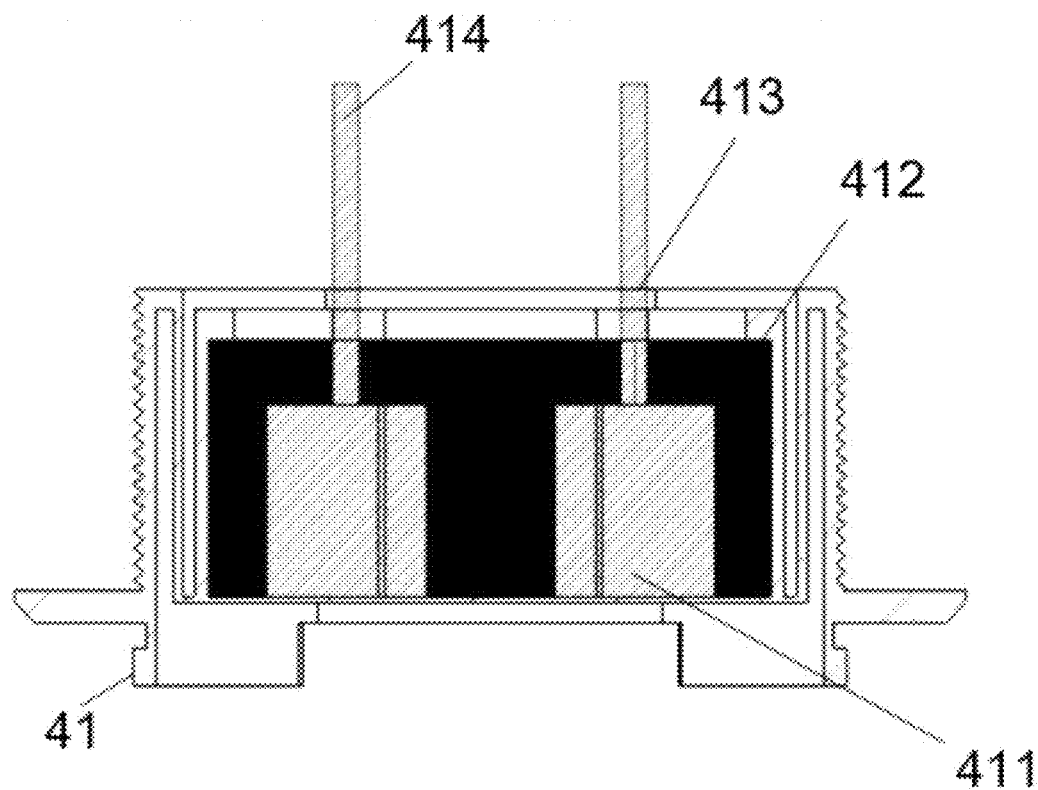
FIG. 4D schematically illustrates a cross-sectional view of the charging port of the magnetically coupled charging system along the B-B' line of FIG. 4C according to an embodiment of the present disclosure.
Figure 4E:
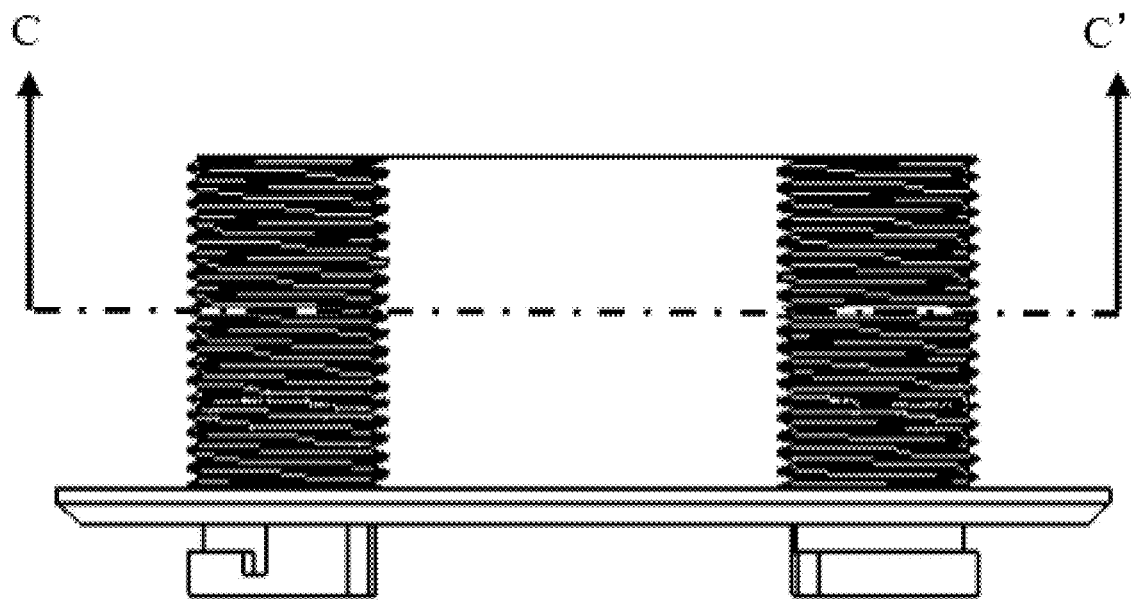
FIG. 4E illustrates a schematic diagram of a point of coupling of the magnetically coupled charging system according to an embodiment of the present disclosure when in contact.
Figure 4F:
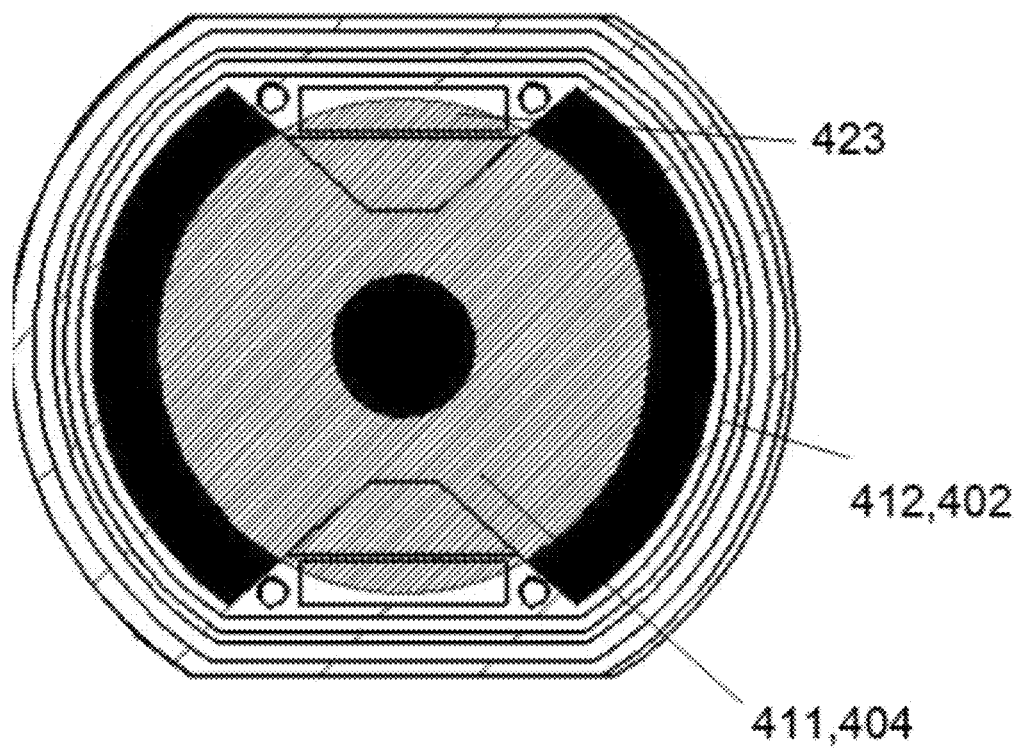
FIG. 4F illustrates a cross-sectional view of the point of coupling of the magnetically coupled charging system along the C-C' line of FIG. 4E according to an embodiment of the present disclosure when in contact.

FIGS. 4A and 4B respectively illustrate a schematic diagram and a cross-sectional view of the charging gun 307 of the magnetically coupled charging system according to an embodiment of the present invention. FIGS. 4C and 4D respectively illustrate a schematic diagram and a cross-sectional view of the charging port 308 of the magnetically coupled charging system according to an embodiment of the present invention. FIGS. 4E and 4F respectively illustrate a schematic diagram and a cross-sectional view of a point of coupling of the magnetically coupled charging system according to an embodiment of the present invention. For clear illustration, only some components in the charging gun 307 and the charging port 308 are shown, and other components, such as rectifiers, capacitors, and the like are omitted. As shown in FIGS. 4A and 4B, the power supply wire 401 is sealed in the wire hole in the handle 302 of the charging gun 307. The power supply wire 401 is connected to the primary winding 404 of the split core transformer 104 through the wire hole 403, thereby transmitting power from the power supply to the primary winding 404 in a first magnetically split core. In the meanwhile, the primary winding 404 is annular, and surrounded by a first filling 402. The primary winding 404 is annular and surrounded by the first filling. The primary winding is wound onto the half core. The charging port 308 shown in FIGS. 4C and 4D includes a secondary winding 411 which is annular with a second filling 412 surrounding the inside and outside of the annular shape. The secondary winding is connected by a wire 414 to the circuit of the onboard charger. The wire 414 is fixed into the wire hole 413 for detachable connection or fixed connection with the onboard charger as required. FIGS. 4C and 4D also illustrate an annular snap portion 415 to be engaged with a lower side of the first locking portion 303 of the onshore charger system.

FIGS. 4E and 4F illustrate a structure at the point of coupling of the assembled magnetically coupled charging system according to an embodiment of the present invention, showing the primary winding 404 and the secondary winding 411, as well as the first filling 402 and the second filling 412 surrounding the primary winding 404 and the secondary winding 411 when in a coupled state; the structure is in an overlapping position when in the coupled state. When a plug of the charging gun 307 (as shown in FIGS. 3 and 4A) is completely inserted into the receiver of the charging port 308 (FIG. 4C), the first locking portion 303 moves downward, and the plug is securely mounted on the port by the combination of the rotating locking mechanism formed by the first locking portion 303 and the second locking portion 305 (as shown in FIG. 3). FIGS. 4E and 4F illustrate a cross-section between the plug and the receiver at the port of the charging gun. The plug of the charging gun 307 further includes a small drain hole 423 for providing a channel mechanism that can drain liquid and air when the charging gun 307 is coupled to the charging port 308, and the small drain hole 423 is in communication with the coupled position and the outside of the split core transformer 104, so as to provide a drainage channel for residual liquid and air between the plug of the charging gun 307 and the charging port 308 to drain to an outside location. This naturalizes the pressure at the point of coupling and simplifies the insertion and removal of the charging gun 307. Although the present disclosure provides only one drain hole 423, it is apparent that the charging gun 307 may include more than one drain hole 423 for draining residual liquid and air without departing from the scope and spirit of the present disclosure.

Figure 7A:
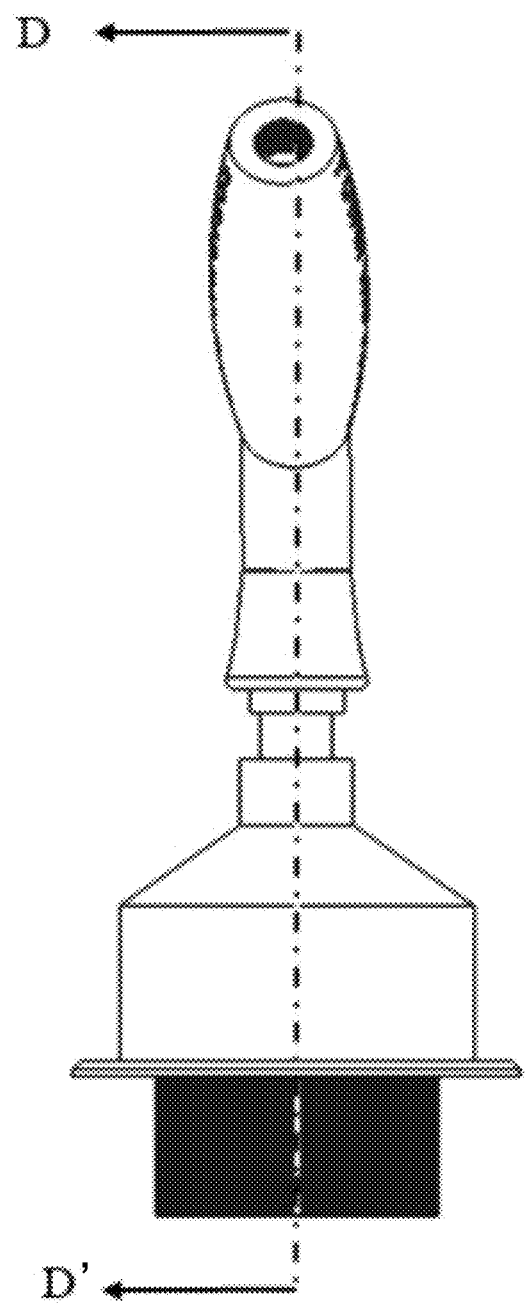
FIG. 7A is a schematic diagram of an assembled magnetically coupled charging system according to an embodiment of the present disclosure.
Figure 7B:
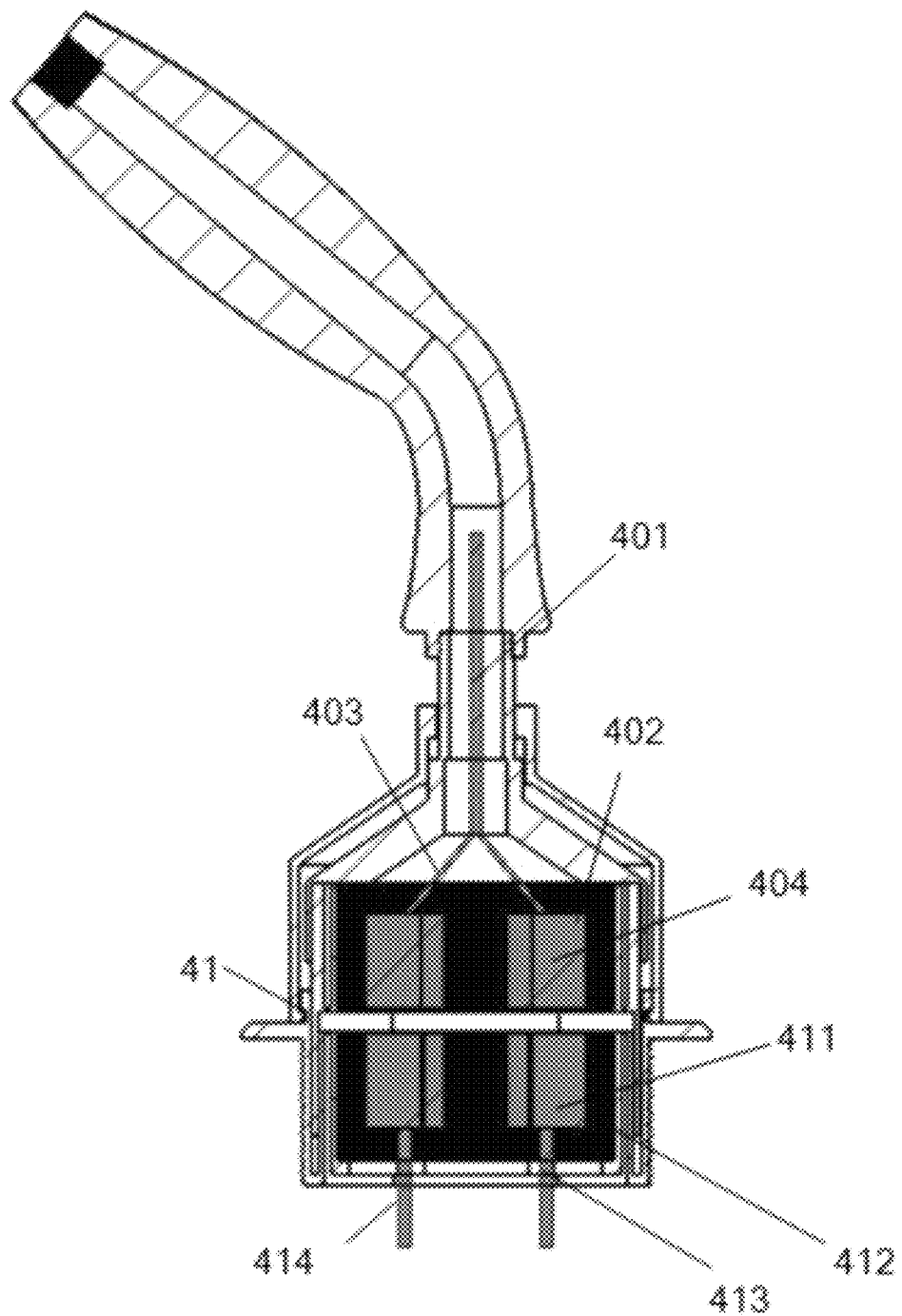
FIG. 7B is a cross-sectional view of the assembled magnetically coupled charging system along the D-D' line of FIG. 7A according to an embodiment of the present disclosure.

FIGS. 7A and 7B illustrate a schematic diagram and a cross-sectional view of the assembled magnetically coupled charging system according to an embodiment of the present invention. As shown in the figures, when coupled, the charging gun 307 and the charging port 308 are in close contact and are connected to each other through the annular snap portion 415, and the positions of the primary winding 404 and the secondary winding 411 correspond to each other, so as to implement the charging process under a sealed condition.

The present invention further provides a charging method to provide a fully insulated and waterproof method for charging an electric boat. According to this method, a completely sealed winding and a magnetically split core located at the charging gun 307 are adopted and connected to an onshore charger system (a charging gun) and a charging port 308 located on the electric boat.

Figure 5:
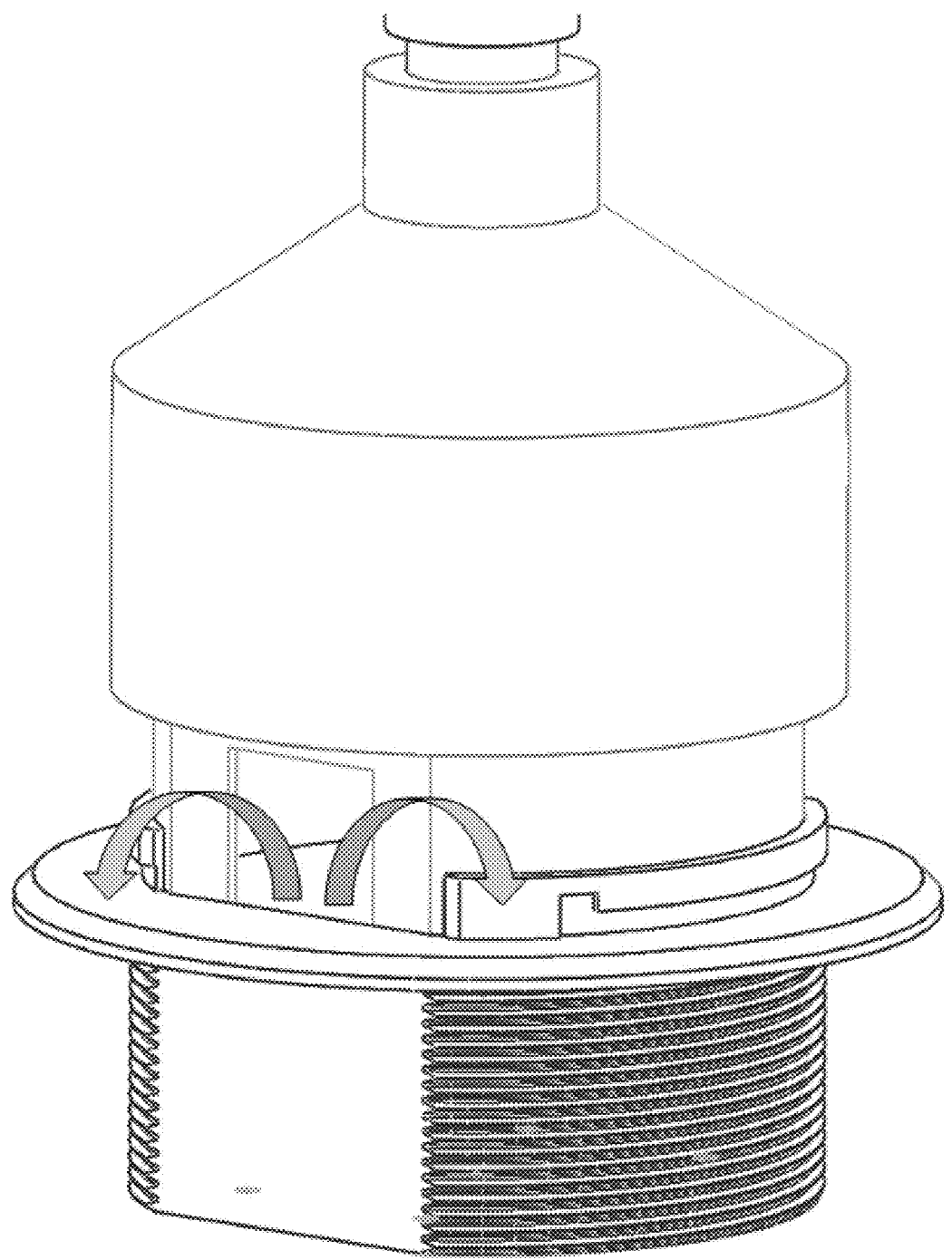
FIG. 5 is a schematic diagram of the magnetically coupled charging system according to an embodiment of the present disclosure, showing a channel mechanism that allows water to drain when a plug is inserted.

FIG. 5 is a schematic diagram of the magnetically coupled charging system according to an embodiment of the present invention, showing a channel mechanism and process of inserting the plug of the charging gun 307 into the receiver of the charging port 308. The channel mechanism comprises a drain hole 423. During insertion, if there is residual water between the plug and a surface of the receiver, the residual water will be pushed to the outside location through the drain hole 423 in a manner shown by the arrows.

Figure 6:
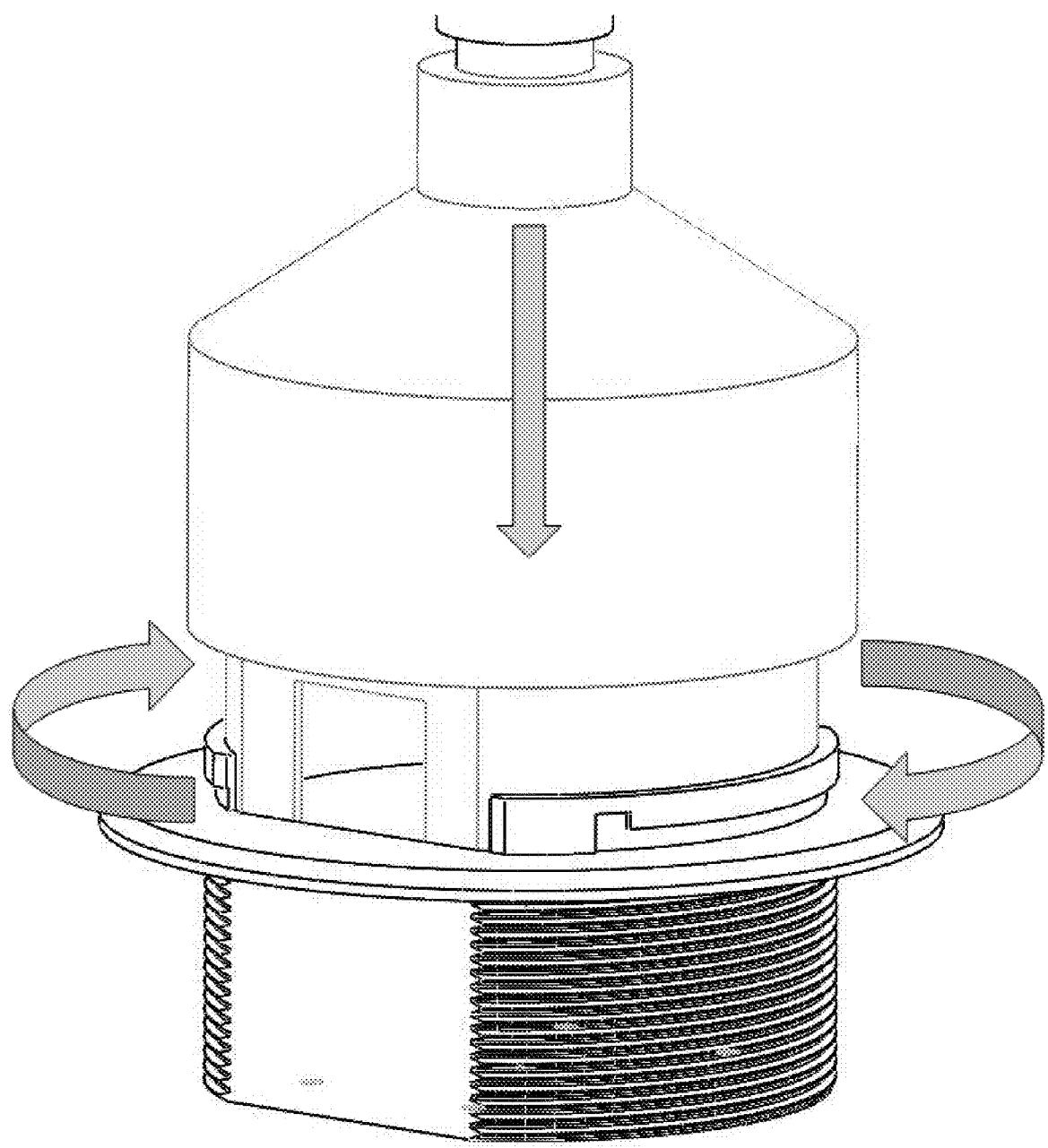
FIG. 6 is a schematic diagram of the magnetically coupled charging system according to an embodiment of the present disclosure, showing a locking slot and a locking mechanism.

FIG. 6 shows the first sealing portion 304, the first locking portion 303, the second sealing portion, and the second locking portion 305 of the magnetically coupled charging system according to an embodiment of the present invention. A locking mechanism is provided for locking or unlocking the charging gun 307 and the charging port 308 with respect to each other. In certain embodiments, the locking mechanism is a rotating locking mechanism. Particularly, the locking mechanism comprises a locking protrusion provided on the first locking portion 303, and an upwardly protruding annular portion provided on the second locking portion 305. The first locking portion 303 can accommodate the first sealing portion 304, and an inner contour of the first locking portion 303 corresponds to an outer contour of the first sealing portion 304, so that the first locking portion 303 and the first sealing portion 304 will not move relative to each other substantially during locking. The locking protrusion is provided on an inner lower side of the first locking portion 303, and the locking protrusion is arranged partially around the inner contour of the first locking portion 303. A side surface of the annular portion includes a slot and a second protrusion. The locking protrusion and the slot are engaged so that the locking mechanism can securely mount the charging gun 307 into the charging port 308. The slot corresponds to the locking protrusion of the first locking portion 303, so that the locking protrusion enters the slot when the plug is inserted into the receiver; and then the plug is turned clockwise and the plug will be securely locked into the slot of the second locking portion 305. In other words, the locking protrusion engages with the slot to restrict the movement of the charging gun 307 with respect to the charging port 308. The rotating locking mechanism ensures that the plug of the charging gun 307 is securely installed when the plug of the charging gun 307 is completely inserted into the charging port 308 of the electric boat. Moreover, the drain hole 423 ensures that the charging gun 307 can be easily inserted into and unplugged from the charging port 308.

Figure 8:
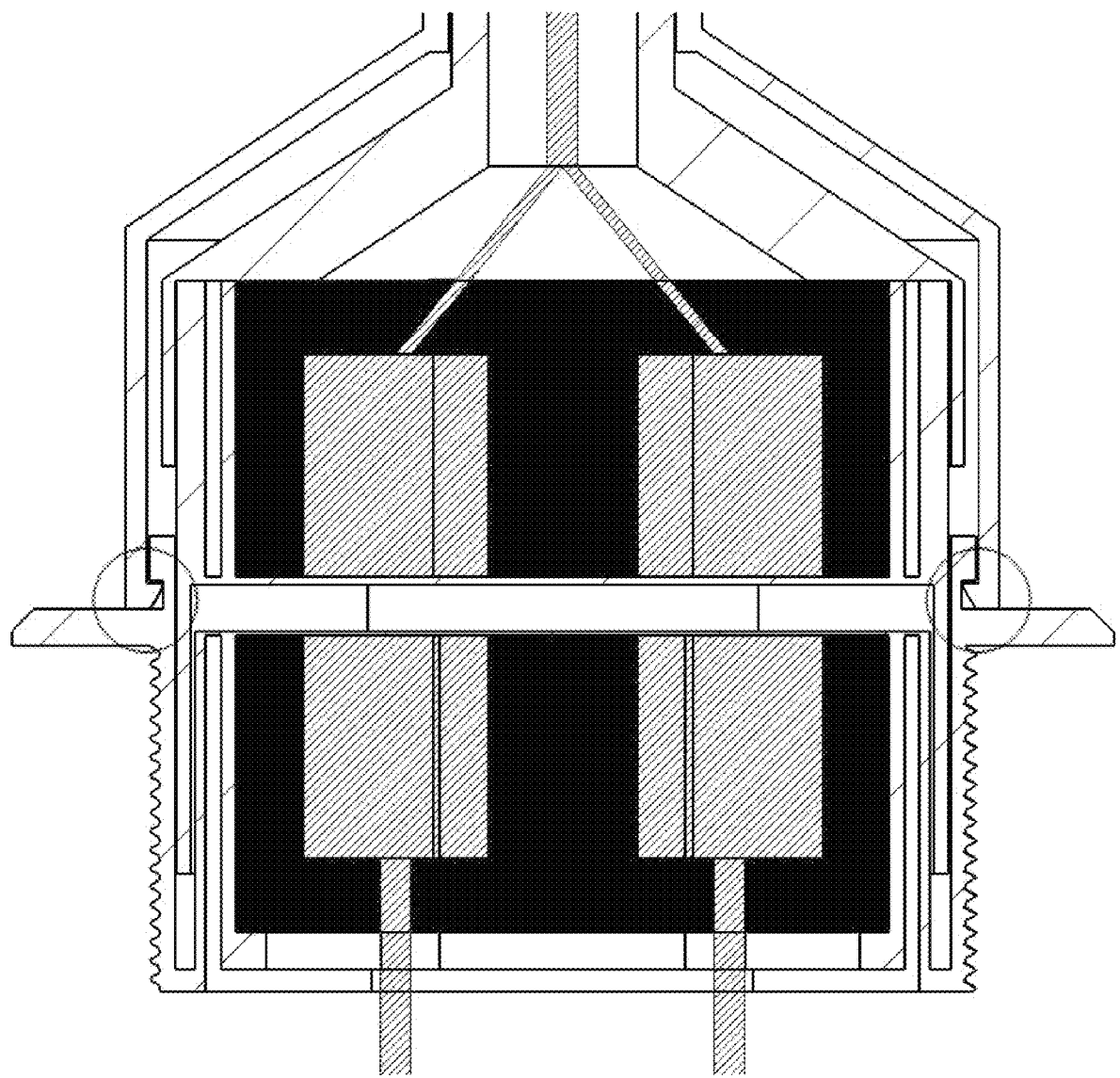
FIG. 8 is a schematic diagram of the magnetically coupled charging system according to an embodiment of the present disclosure, showing a locking anchor of the plug and how a receiver is inserted.

FIG. 8 illustrates an enlarged view of the connection of the first locking portion 303 and the second locking portion 305 shown in FIG. 6. As shown in the figure, the slot and the locking protrusion are locked and fixed to each other, thereby allowing the plug to be fixed to the receiver by the structure of a locking anchor.

Compared with a traditional conducting charger, the charging system allows a higher degree of coupling positioning tolerance. Compared with existing inductive chargers, the split core design with the locking mechanism provides a higher but stable coupling coefficient. The charging system provides a longer service life by eliminating a wear issue between a lead and a contact point. A connector does not require a high insertion force. The onboard charger assembly provides precise battery charging control with a fast response time and allows a wide range of input and output operating conditions.

Compared with a traditional charger, the magnetically coupled charging system of this application can be used to achieve the following effects: the risk of electric shock and short circuit failure at the connection point is eliminated; the arcing or sparking problem is eliminated; galvanic isolation is provided between the power supply and the receiver terminal and the corrosion problem of exposed conductors at the charging terminal can be eliminated; the cycle life of the connector is improved by eliminating the wear issue of the contact point; no high insertion force is required, and concerns about the problems of phase and electrode positions in the traditional conducting charger can be alleviated. Compared with other inducting chargers, the magnetically coupled charging system of this application achieves a higher but stable coupling coefficient and stability and allows a higher degree of coupling positioning tolerance. Due to the addition of core filling, the magnetically coupled charging system can handle the challenges of water seepage, submersion, and bumping and falling in a wide range of outdoor uses. Furthermore, the onboard charger according to the present invention can provide precise battery charging control and fast response and allow a wide range of input and output operating conditions.

While the present invention has been described in detail with reference to specific embodiments, various modifications within the scope of the present invention will be apparent to those skilled in the art. Accordingly, the scope of the disclosure is indicated by the appended claims rather than by the preceding description, and all changes that come within the meaning and range of equivalency of the claims are therefore intended to be embraced therein.

What is claimed is:

1. A magnetically coupled charging system, comprising:
   a resonant inverter;
   a split core transformer configured to receive a resonant power from the resonant inverter; and
   a rectifier assembly configured to receive a transformed resonant power from the split core transformer and transmit the transformed resonant power to a to-be-charged battery,
   wherein:
   the split core transformer comprises a primary winding and a secondary winding, wherein the primary winding, and the secondary winding are split from each other;

the resonant inverter and the primary winding of the split core transformer are arranged in an onshore charging system; and the rectifier assembly and the secondary winding of the split core transformer are arranged in an onboard charger, wherein the onshore charging system further comprises a first sealing portion for sealing the resonant inverter and the primary winding of the split core transformer, the onshore charging system further comprises a first locking portion located outside the first sealing portion and surrounding the first sealing portion or located above the first sealing portion;

the first locking portion further comprises a locking protrusion provided at a lower side of the first locking portion;

the onboard charger further comprises a second locking portion configured as an upwardly protruding annular portion matched with the lower side of the first locking portion; and a side surface of the annular portion including a slot corresponding to the locking protrusion of the first locking portion to receive and fix the locking protrusion in place during coupling.

2. A magnetically coupled charging system, comprising:
a resonant inverter;
a split core transformer configured to receive a resonant power from the resonant inverter; and
a rectifier assembly configured to receive a transformed resonant power from the split core transformer and transmit the transformed resonant power to a to-be-charged battery,
wherein:
the split core transformer comprises a primary winding and a secondary winding, wherein the primary winding, and the secondary winding are split from each other;
the resonant inverter and the primary winding of the split core transformer are arranged in an onshore charging system; and
the rectifier assembly and the secondary winding of the split core transformer are arranged in an onboard charger,
wherein the onshore charging system further comprises a first digital controller connected to the split core transformer and the resonant inverter and configured to control a phase angle and frequency of the resonant inverter according to a pre-determined charging mode.

3. A magnetically coupled charging system, comprising:
a resonant inverter;
a split core transformer configured to receive a resonant power from the resonant inverter; and
a rectifier assembly configured to receive a transformed resonant power from the split core transformer and transmit the transformed resonant power to a to-be-charged battery,
wherein:
the split core transformer comprises a primary winding and a secondary winding, wherein the primary winding, and the secondary winding are split from each other;
the resonant inverter and the primary winding of the split core transformer are arranged in an onshore charging system; and
the rectifier assembly and the secondary winding of the split core transformer are arranged in an onboard charger,
wherein the onboard charger further comprises a synchronous buck converter connected to the to-be-charged battery and the split core transformer, wherein the synchronous buck converter is configured to determine a charging condition of the to-be-charged battery according to a battery voltage, a sensed average charging current and a state of the to-be-charged battery.

4. A magnetically coupled charging system, comprising:
a resonant inverter;
a split core transformer configured to receive a resonant power from the resonant inverter; and
a rectifier assembly configured to receive a transformed resonant power from the split core transformer and transmit the transformed resonant power to a to-be-charged battery,
wherein:
the split core transformer comprises a primary winding and a secondary winding, wherein the primary winding, and the secondary winding are split from each other;
the resonant inverter and the primary winding of the split core transformer are arranged in an onshore charging system; and
the rectifier assembly and the secondary winding of the split core transformer are arranged in an onboard charger,
wherein the onboard charger further comprises a second digital controller connected to the split core transformer, the to-be-charged battery and the rectifier assembly, and the second digital controller optimizes the charging condition and safety of an energy storage system according to detected states of the onboard charger and the to-be-charged battery.

5. The magnetically coupled charging system according to claim 4, wherein the second digital controller compensates the sensed average charging current according to a pre-defined reference current using a functional relationship in a case of constant current charging.

6. A magnetically coupled charging system, comprising:
a charging gun comprising a handle and a body housing a resonant inverter and a primary winding, wherein the body further comprises a first locking portion and a first sealing portion;
a charging port housing a rectifier assembly and a secondary winding and comprising a second locking portion and a second sealing portion;
a locking mechanism provided for locking or unlocking the charging gun from the charging port,
wherein:
the primary winding and the secondary winding form a split core transformer when the charging gun is magnetically coupled to the charging port;
the locking mechanism comprises a locking protrusion on the first locking portion and an upwardly protruding annular portion having a slot on the second locking portion; and
the locking protrusion and the slot are engaged to restrict a movement of the charging gun with respect to the charging port.

7. The magnetically coupled charging system of claim 6, wherein:
the first locking portion is located outside the first sealing portion and surrounding the first sealing portion or located above the first sealing portion; and the locking protrusion is provided at a lower side of the first locking portion; and the upwardly protruding annular portion matches with the lower side of the first locking portion; and the slot corresponds to the locking protrusion of the first locking portion to receive and fix the locking protrusion in place during coupling.

8. The magnetically coupled charging system of claim 6 further comprising a channel mechanism configured for draining liquid and air from the split core transformer to an outside location, wherein the channel mechanism comprises a drain hole as a drainage channel.

9. A magnetically coupled charging method implemented by using a magnetically coupled charging system comprising:

a resonant inverter;

a split core transformer configured to receive a resonant power from the resonant inverter; and a rectifier assembly configured to receive a transformed resonant power from the split core transformer and transmit the transformed resonant power to a to-be-charged battery, wherein:

the split core transformer comprises a primary winding and a secondary winding, wherein the primary winding and the secondary winding are split from each other;

the resonant inverter and the primary winding of the split core transformer are arranged in an onshore charging system; and the rectifier assembly and the secondary winding of the split core transformer are arranged in an onboard charger, wherein the onshore charging system further comprises a first sealing portion for sealing the resonant inverter and the primary winding of the split core transformer, wherein:

the onshore charging system further comprises a first locking portion located outside the first sealing portion and surrounding the first sealing portion or located above the first sealing portion;

the first locking portion further comprises a locking protrusion provided at a lower side of the first locking portion;

the onboard charger further comprises a second locking portion configured as an upwardly protruding annular portion matched with the lower side of the first locking portion; and a side surface of the annular portion including a slot corresponding to the locking protrusion of the first locking portion to receive and fix the locking protrusion in place during coupling.

\* \* \* \* \*